No. 749,359. PATENTED JAN. 12, 1904.
W. H. BUTLER.
BOX MAKING MACHINE.
APPLICATION FILED NOV. 7, 1899.
NO MODEL. 7 SHEETS—SHEET 2.

Fig. 2.

WITNESSES:

INVENTOR
William H. Butler
BY
Kenyon & Kenyon
ATTORNEYS

No. 749,359. PATENTED JAN. 12, 1904.
W. H. BUTLER.
BOX MAKING MACHINE.
APPLICATION FILED NOV. 7, 1899.
NO MODEL. 7 SHEETS—SHEET 6.

WITNESSES:

INVENTOR
William H. Butler
BY
Kenyon & Kenyon
ATTORNEYS

No. 749,359. PATENTED JAN. 12, 1904.
W. H. BUTLER.
BOX MAKING MACHINE.
APPLICATION FILED NOV. 7, 1899.
NO MODEL.
7 SHEETS—SHEET 7.

WITNESSES:

INVENTOR
William H. Butler
BY
Kenyon & Kenyon
ATTORNEYS

No. 749,359. Patented January 12, 1904.

UNITED STATES PATENT OFFICE.

WILLIAM H. BUTLER, OF NEW YORK, N. Y.

BOX-MAKING MACHINE.

SPECIFICATION forming part of Letters Patent No. 749,359, dated January 12, 1904.

Application filed November 7, 1899. Serial No. 736,106. (No model.)

*To all whom it may concern:*

Be it known that I, WILLIAM H. BUTLER, a citizen of the United States, and a resident of New York city, in the county and State of New York, have invented a certain new and useful Improvement in Box-Making Machines, of which the following is a specification.

My invention relates to box-making machines. It has for its object to provide means for making out of blanks boxes having the top and bottom of the box provided with side flaps and with the side flaps of the top lying outside of and over the flaps of the bottom of the box, also improved means for turning the forward part of the blank up and backward and down to form the top of the box and for holding it down and for turning the rear flap up and forward and down upon the top of the box, and also improved means for holding a shell while a box is being inserted therein and for discharging the completed shell.

It consists of the novel devices herein shown and described.

My improved devices are shown in the drawings herein and will be described in connection with a machine for automatically making cigarette-boxes out of flat box-blanks, inserting cigarettes into the box, closing the box, inserting the filled box into an outer cover or shell, and discharging the covered box from the machine. My improved devices may, however, be used in or in connection with other kinds of box-making or box-filling and box-covering machines, although I prefer to use them in a machine in which all of the operations are continuously and automatically performed.

In the drawings accompanying this specification and forming part hereof I have shown and will now proceed to describe the preferred form of my improved devices, similar reference characters in the different figures representing corresponding parts of the mechanism.

My improved devices are shown in connection with a machine for automatically making boxes out of box-blanks, filling the boxes with cigarettes, and then inserting the filled boxes into an outer shell.

Figure 1:
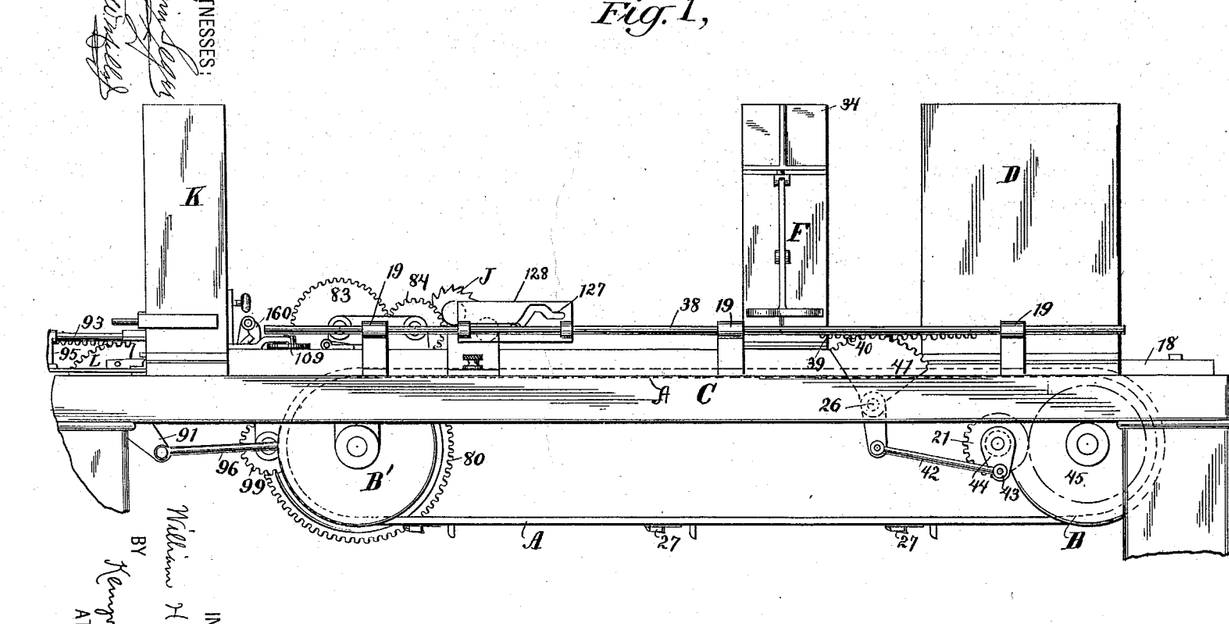
Figure 1 is a side view of a machine for making cigarette-boxes from blanks, filling the boxes with cigarettes, and inserting the boxes in outer shells and discharging the completed boxes from the machine.

Many of the general features of the machine shown and described are old and well known—such, for example, as the magazine for box-blanks, the means for feeding forward the box-blanks, the means for performing certain parts of the operation of making the box, the means for filling the box with cigarettes, and some of the means for forcing the completed box into an outer shell. The details of such well-known parts of the machine are not shown in the drawings and will not be described in detail in the specification. In Fig. 1 I have shown, however, the general arrangement and location of these different parts in the machine in connection with which my improved devices are shown, and I will now briefly describe the general features of this machine.

In the usual way an endless belt A passes over and is driven by two pulleys B B' and passes above a table C, where it receives the box-blanks from the magazine D and pushes them forward by means of pickers 27 through a trough E to the end of the machine. Any suitable form of blank may be employed; but I prefer to use one of the form shown in Fig. 12, in which 2 is the rear part of the blank and forms the bottom of the box when made and has two side flaps 4 4 and a rear flap 5, creased along the line 6 6, and 3 is the forward part of the blank and forms the top of the box when made. Part 3 has side flaps 7 7, with a part 8 connecting it with the rear part 2 of the box. Side flaps are creased along the line joining them to the parts 2 and 3, respectively. These blanks are stored in magazine D, which is made of a convenient form to hold them. The blanks are fed out from the magazine D by plunger 18, which can be actuated by any suitable means; but as this forms no part of my invention it is not shown and will not be further described. As the blanks are fed out from the magazine D pickers 27 engage with the rear of the blank and push it forward through the trough E. As it proceeds through the trough the side flaps of the forward and rear ends of the blank are turned up into a vertical position by means of the side walls of the trough converging toward each other in the usual manner. As the bottom 2 of the box comes opposite magazine F, containing the cigarettes, the proper number of cigarettes is fed down into the box, which by this time has its side flaps 4 turned up into a vertical position. The means for feeding the cigarettes into the box form no part of the present invention and are not shown in detail and will not be further described. The forward end 3 of the blank is then turned upward and backward and downward over the bottom of the rear end 2, with the side flaps 7 passing outside of and over side flaps 4, and the rear flap 5 is turned upward and forward and downward upon the top of the box by means presently to be described, and the filled box is then inserted into a shell which has been opened and squared for the purpose, and the completed box is then discharged from the machine by means presently to be described. These movements are preferably accomplished automatically through the driving mechanism of the machine. For accomplishing some of them I use the rod 38, mounted in bearings 19 and driven from pulley B through gear 45, mounted on the same shaft and rotating with the pulley, gear 21 meshing therewith, crank-arm 44, secured on the same shaft as gear 21 and rotating therewith, rod 42, pivotally secured to the crank-arm at 43, and sector 41, pivoted at 26 and connected at one end with rod 42, teeth 40 of sector 41 meshing with rack 39 on rod 38. A reciprocating to-and-fro movement is thus given to rod 38.

Figure 18:
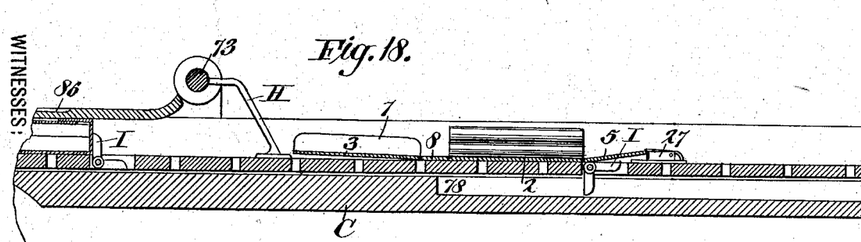
Figs. 18, 19, and 20 are enlarged detail views showing the action of the folders H on the blank in successive stages of their operation.
Figure 19:
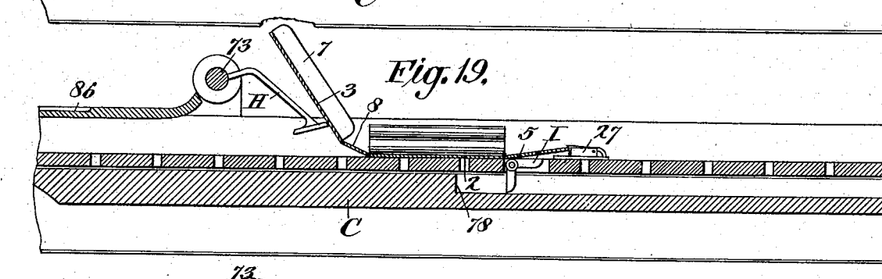
Figure 20:
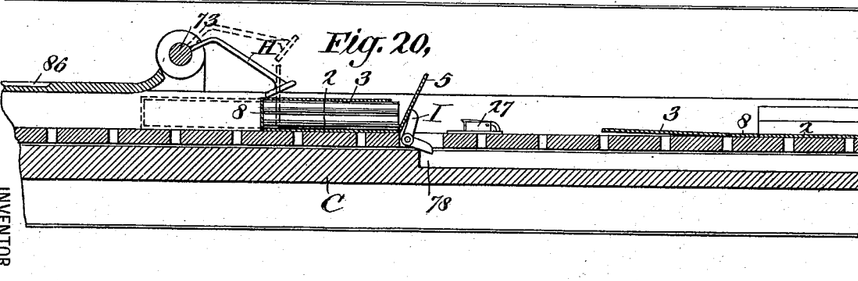

My improved means for raising the forward part of the blank and turning it backward and down upon the rear end of the blank to form the top of the box will now be described. The side flaps 7 7 of the forward part 3 of the blank having been raised into vertical position by means of the sides of the trough contracting and gradually becoming more inclined, as above described, and in the well-known way, I widen trough E at points 125, (see Fig. 2,) and at this part of the trough I place an upright plate 126 in line with each side of the narrower part of the trough. These upright plates run through the widened part of the trough and form a continuation of the walls of the narrow part of the latter. They keep the side flaps 4 4 of the rear part of the blank, which have been previously raised to the upright position in the same manner as above described with reference to flaps 7 7, from spreading as the rear part of the blank 2 passes through this widened part of the trough. As the forward part 3, with its flap 7 7, emerges from the narrow part of the trough into the widened part they are automatically raised by folders H H, (see Figs. 18 and 19,) by means presently to be described, and are then bent backward and downward upon part 2. (See Fig. 20.) As forward part 3 and flaps 7 7 thus rise, flaps 7 7 as soon as they are free from upright plates 126 spread outward slightly, owing to the elasticity of the paper, and as forward part 3 and the flaps 7 7 are bent backward and downward over the bottom of the box, as shown in Fig. 20, flaps 7 7 pass outward and downward over flaps 4 4, which are held upright and are kept from spreading by means of plates 126.

Figures 4, 5, 6, 7, 8:
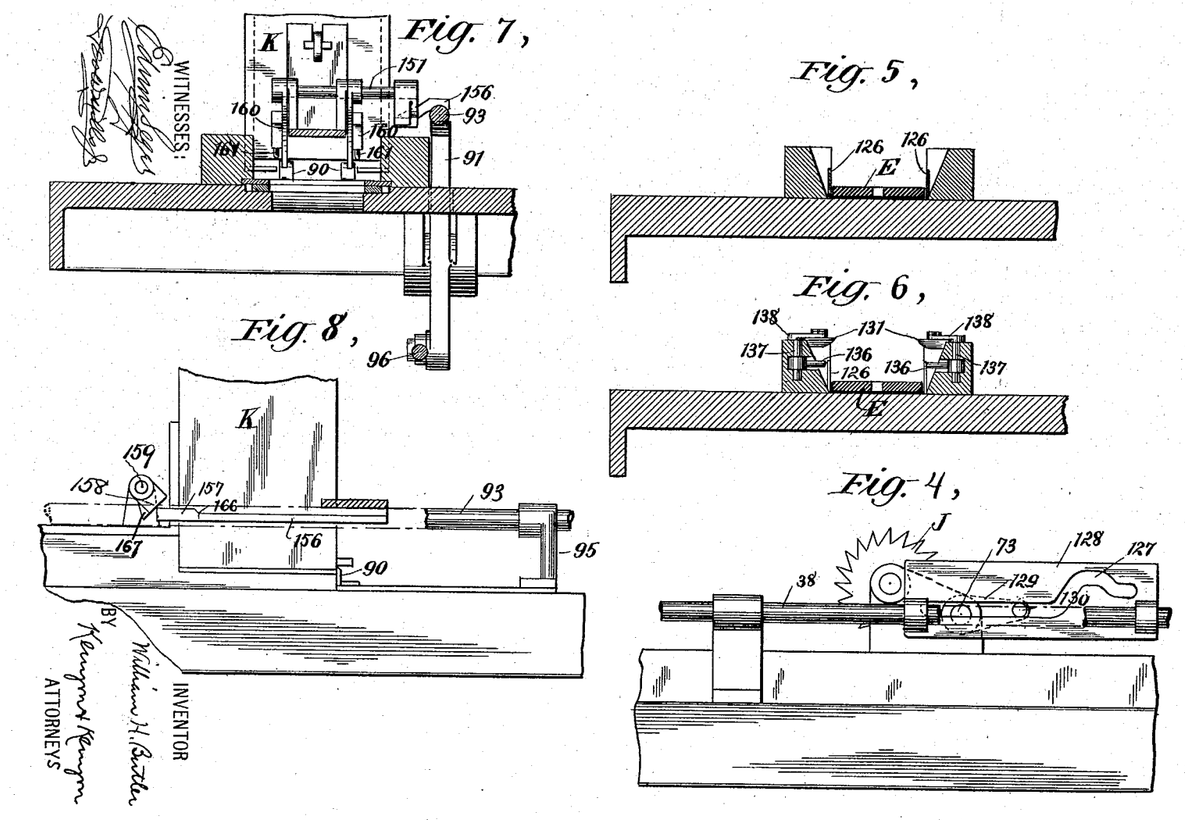
Fig. 4 is a detailed view of the cam-plate for moving folders H.
Fig. 5 is a cross-section through the trough, taken through the widened part.
Fig. 6 is a similar section taken on the lines 22 22 of Fig. 2.
Fig. 7 is a similar section taken on the lines 23 23 of Fig. 2.
Fig. 8 is a side view of the rear part of the machine shown in Fig. 2.

In order that the folders H H shall rise at the proper time to turn upward and backward the forward part 3 of the blank and then shall press the same down upon the top of the box and in returning to their original position shall then rise in order to clear rear flap 5, I provide a cam-plate 128, which is secured to and moves with rod 38 and has a cam-groove 127 in its surface shaped as shown in Fig. 4. Upon rocking shaft 73, upon which folders H are mounted, I also secure an arm 129, carrying at its end a pin 130, which projects into cam-groove 127. As plate 128 oscillates forward and backward with rod 38, shaft 73 is rocked first upward, so as to carry folders H to their highest limit of movement, thus raising part 3, (Fig. 19 shows it partly raised,) then slightly downward, pressing part 3 down upon the box, as shown in Fig. 20, and on the return movement of plate 128 shaft 73 is again rocked upward slightly to cause folders H to clear rear flap 5, as shown in dotted lines in Fig. 20, and then it is rocked backward to bring the folders down into their original position, ready for the next operation.

Figure 2:
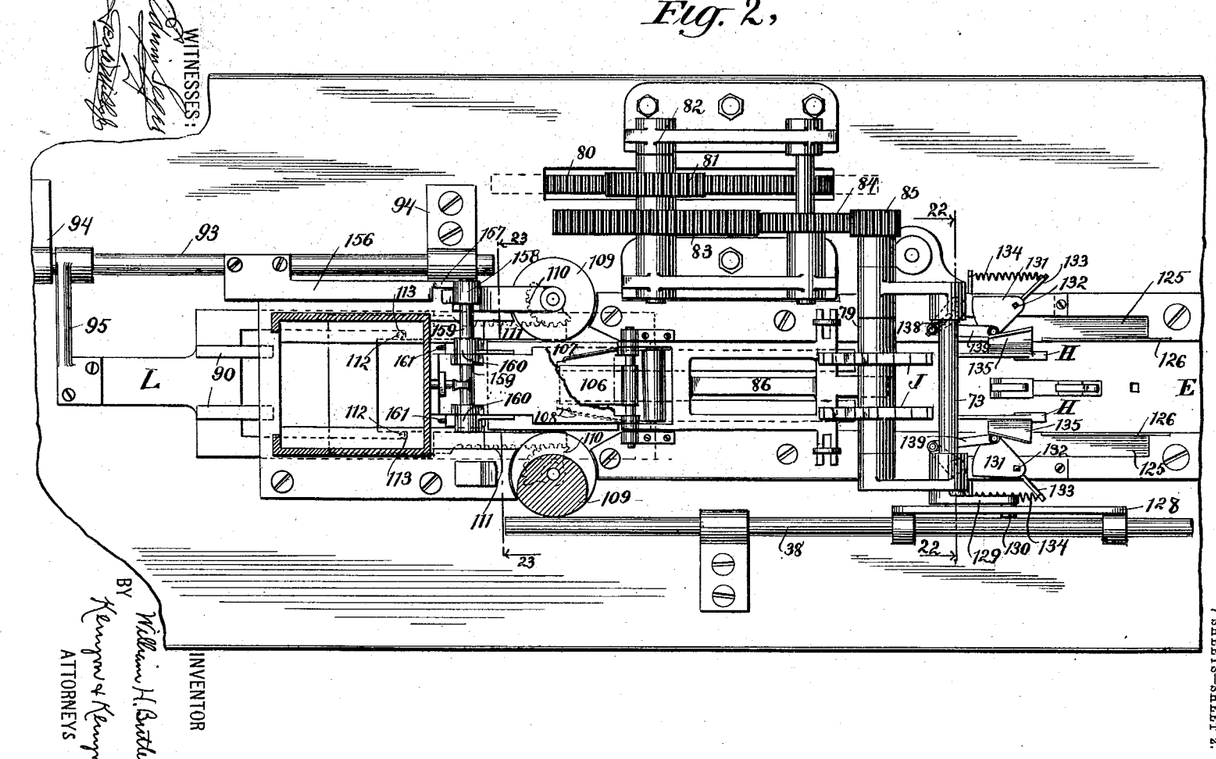
Fig. 2 is a plan view of the rear part of the machine shown in Fig. 1.

As folders H must be raised to clear rear flap 5 as the latter is raised and bent forward and down upon the box, I preferably provide projections 131, adapted normally to extend over the trough to lie over the top of the box to prevent the latter rising when folders H are raised and means for automatically removing the projections. Projections 131 are for the purpose of holding down forward part 3 when the folders H are raised from the box. (See Figs. 2, 3, and 6.) These projections are shaped as shown in Fig. 2 and are pivoted at 132, each having an arm 133, at the end of which is secured a spring 134. This spring tends to throw the outward end of projections 131 outward over trough E. They are normally, however, held backward out of the trough and against the pressure of the spring by means of wings 135, secured to folders H. This position is illustrated in Fig. 2. When the folders are raised, wings 135 are withdrawn from contact with the projections, and the latter move outward, so that their outer edges lie over the trough E and they press upon the box, holding the top 3 down upon the box. In order to remove projections 131 out of the way of rear flap 5, I provide a pin 136, projecting out on each side far enough to be struck by the box in its forward progress. Each pin 136 is secured to a movable stud 137, mounted in the sides of the trough. This stud carries at its upper end an arm 138, which is pivoted to a rod 139, pivoted at its other end to projection 131. Pins 136 are so placed that the forward part of the box will strike these pins and move projection 131 backward or away from over the trough in time to permit the free passage of rear flap 5.

I will now proceed to describe the means for raising the rear flap 5 of the bottom 2 of the box and pressing it forward and down upon the top of the box. The means for raising it to a vertical position consist of folders I, secured at regular stated intervals to endless belt A. These folders consist of two arms, one of which, 77, is adapted normally to project below the level of the belt and the other arm of which is adapted normally to lie in an opening in the belt in line with the belt itself. As these folders reach the proper point for operation part 77 strikes a projection 78 on the table, which moves the part 77 in a line with the belt, raising the part I—the folder proper—into a vertical position. When this movement takes place, flap 5 lies directly over the folder and is raised by it. From this point on the folder pushes the box forward instead of the pickers.

Figures 9, 10, 11:
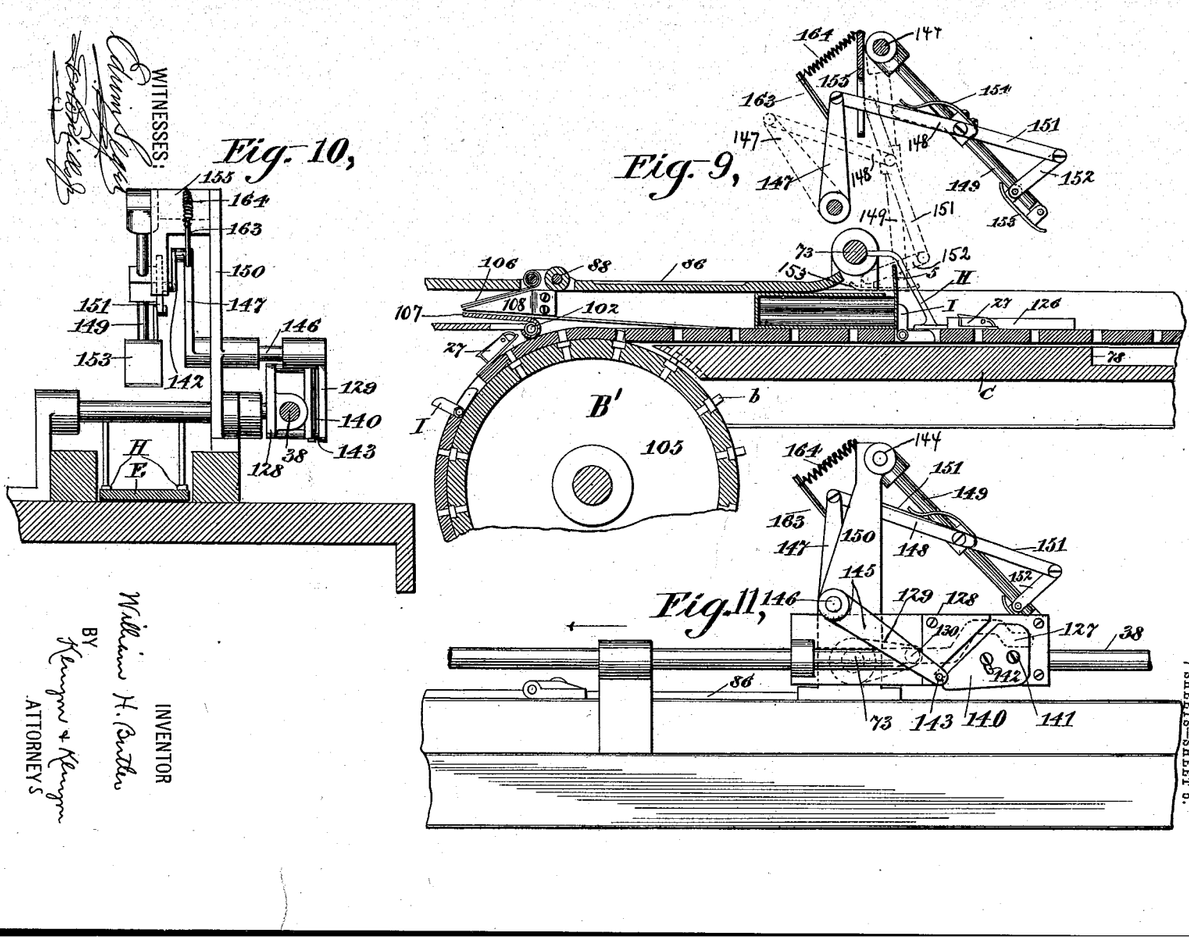
Fig. 9 is a side view of an improved form of the folder for turning the rear flap forward and down.
Fig. 10 is a central longitudinal section of the same.
Fig. 11 is an end view of the same device.

In Figs. 9 to 11, inclusive, I show my improved means for turning forward and down the rear flap 5. The mechanism for this purpose consists of the following: Secured to plate 128 is a cam 140. It is pivotally secured to the plate by screw 141 and a slot 142 in the cam, through which projects a screw from plate 128, from which a slight rocking of the cam on screw 141 as a center can take place. 143 is a roller projecting from the end of arm 145, fixedly mounted on rock-shaft 146. On this same rock-shaft is also fixedly mounted an arm 147, and to its end is secured rod 148. This rod is pivoted at its other end to a swinging arm 149, freely swinging upon shaft 144, mounted in standard 150. Also pivotally secured to swinging arm 149 is a rod 151. At its lower end it is pivotally secured to rod 152, the latter carrying a pivoted swinging folder 153. Folder 153 is pivotally connected to rod 152 near one extremity of the folder, and near its other extremity it is pivotally connected to the lower end of swinging arm 149. Spring 154, mounted on swinging arm 149, is adapted to press against the upper end of rod 151 to move folder 153 to the right, substantially parallel to swinging arm 149, as shown in Fig. 9. 155 is a piece of standard 150 depending in the path of arm 151 for the purpose presently to be described. 163 is an arm projecting from arm 147. Spring 164 is connected to the end of arm 163 and to the upper part of piece 155. This spring tends to keep swinging arm 149 in its upward and outward position, as shown in Fig. 9. The operation of the parts is as follows: In the position of the parts shown in Fig. 11 and in full lines in Fig. 9 rod 38 is moving in the direction of the arrow shown in Fig. 11. Roller 143 on arm 145 is forced upward by the inclined face of cam 140, rocking rock-shaft 146 to the left and moving arm 147 into the position shown in dotted lines in Fig. 9. This brings folder 153 downward and inward toward the box, giving it substantially a horizontal swinging movement. In the first part of this downward movement folder 153 lies parallel to swinging arm 149 and becomes slightly more vertical in position. Before the end of the movement the upper end of rod 151 strikes against the lower part of piece 155, which acts as a rigid stop therefor, forcing rod 151 to assume a position more nearly parallel to swinging arm 149, swinging folder 153 preferably downward upon its pivot and into a horizontal position, as shown in dotted lines in Fig. 9. This occurs about as folder 153 strikes upon the back of flap 5, and as the folder is brought into its horizontal position it folds this flap downward upon the box and for a short distance follows the box inward, or to the left, until flap 5 goes under guide 86. During this slight forward motion of folder 153 roller 143 is traveling along the upper level part of cam 140 until it reaches the vertical right-hand side of the cam, when roller 143 drops downward to the lower part of the cam and spring 164 restores swinging arm 149 and the other parts to their normal position. Roller 143 in the backward movement of rod 38 travels along on the under side of cam 140 and slightly beyond the toe of the cam. As it passes from under the toe of the cam the cam drops downward of its own weight, so that roller 143 on the next forward movement of rod 38 strikes the inclined face of the cam, when the same operation as above described is repeated. Rods 151 and 152 form pivoted connections between the free end of the folder and stop 155. The box, as above described, has thus been filled with cigarettes and the forward end has been turned backward and down to form the top and the rear flap turned upward and forward and down upon the top. The box is now inserted into a shell, the blanks for which are stored in magazine K. These shells are made with one or both ends open and are flattened down and in that position lie in the magazine upon one another. The front wall of the magazine has an opening 89 at its lower end just large enough to allow a shell to be pushed out. This is performed by plunger L by means of pushers 90 90. Motion is imparted to plunger L by means of a toothed segment 91 meshing with teeth 92 on the lower side of rod 93. This rod moves freely in bearings 94 and is connected by arm 95 with plunger L. As the segment 91 reciprocates one way or the other plunger L moves with it through the means above described. Segment 91 is driven by means of pitman 96, pivoted to crank-arm 97, mounted on shaft 98. On the same shaft is gear-wheel 99, which meshes with large gear 100 on the shaft of pulley B'. As the pulley-shaft revolves plunger L is reciprocated backward and forward, feeding forward one shell at a time.

Figures 3, 12, 13:
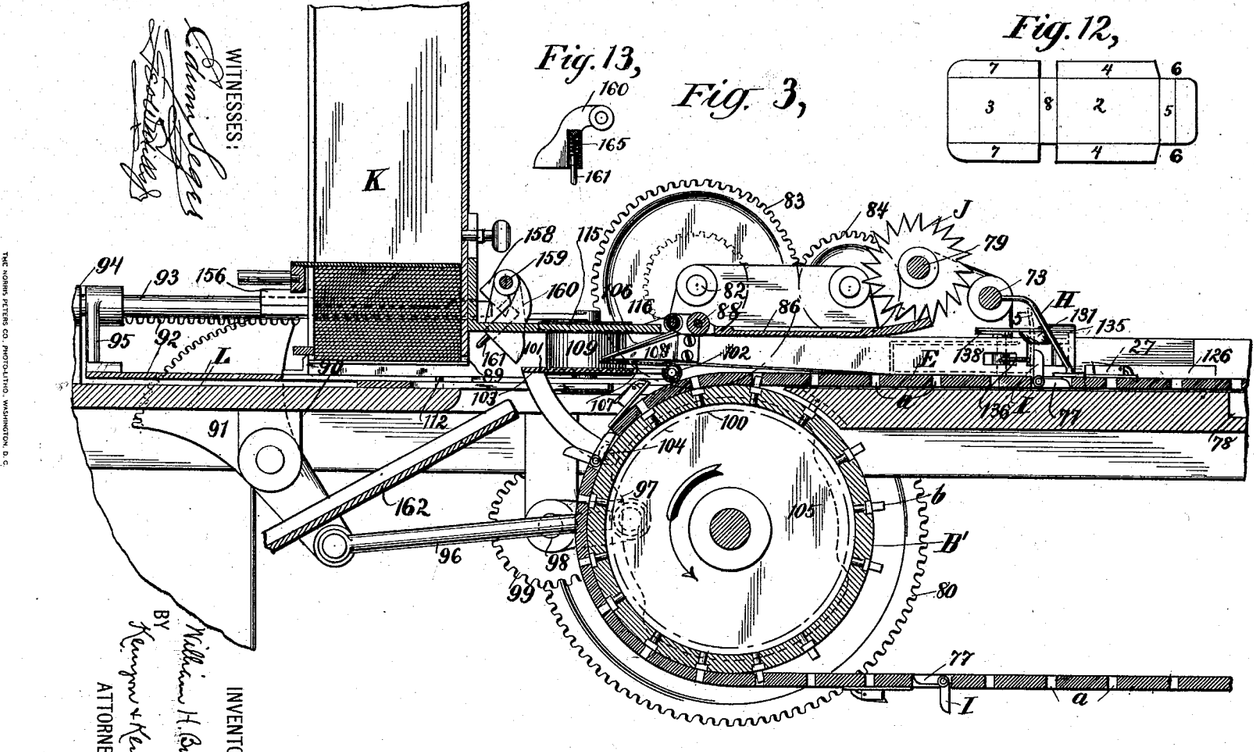
Fig. 3 is a central longitudinal section thereof.
Fig. 12 is a view of the preferred form of blank used by me in making boxes.
Fig. 13 is a detail of the stops.

As the shell is forced by pushers 90 out from the magazine it falls upon the swinging platform 101. This platform is pivoted at 102 and is supported at its outer end by curved arms 103, carrying at their lower ends friction-rolls 104. These rolls 104 press upon and are supported by cams 105, mounted upon and turning with the shaft of pulley B'. When a shell is discharged upon platform 101, the cam is in such position that the platform is supported in its horizontal position, as shown in Fig. 3. After the box has been completely inserted into the shell the cams have reached the point where they allow rolls 104 to sink downward, thus tilting platform 101 downward sufficiently to cause the covered box to slide off from the platform into chute 162.

For opening and squaring the flattened shells I use a wedge-shaped device, consisting of spring-plates, forming the top, bottom, and sides of the wedge. As shown, the wedge consists of top plate 106, two bottom plates 107, and two side plates 108. Each of these is secured at its end farthest removed from the shell-magazine. The wedge-shaped device enters the flattened shell and squares it. The box is then forced by the belt forward into the open end of the wedge-shaped device, forcing the spring, top, bottom, and sides of the latter apart, and passes into the shell. To assist the wedge-shaped device in opening or squaring a shell, I provide devices for exerting a pressure on the sides of the flattened shell as it comes from the magazine to cause the shell to open sufficiently to permit the wedge-shaped device to enter the shell. These devices consist of cams 109, one on each side of the trough E. Each cam has secured to it a toothed segment 110, the teeth of which mesh into a straight rack 111. Each of the latter carries a pin 112 at its end toward the magazine. As plunger L moves forward to force a shell from the magazine the part of its surface near the pushers strikes pins 112 toward the close of the forward movement of plunger L, moves racks 111, and thereby rotates cams 109. As the cams rotate they project forward and strike against both sides of the flattened shell, partially opening the latter to permit the wedge-shaped device to enter. On the return of plunger L to its original position shoulders 113 on each side strike against pins 112, carrying them and the racks 111 and the cams back to their original positions.

86 is an upper plate or guide pivoted at 88, lying over the trough in front of the wedge-shaped device, and acts as a guide to force the filled boxes into the wedge. It is pivoted to allow it to be raised in case of clogging at this point.

Figures 14, 15:
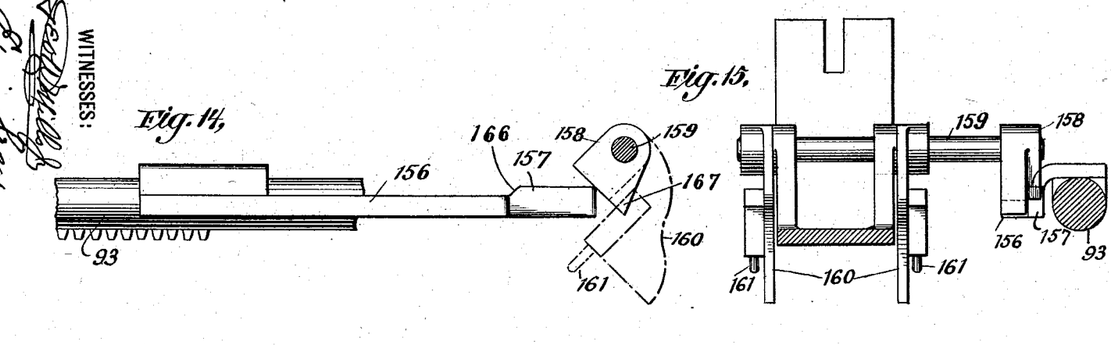
Figs. 14, 15, 16, and 17 are enlarged detail views of my improved means for holding the shell while the box is being inserted therein and for aiding in the discharge of the completed box.
Figure 16:
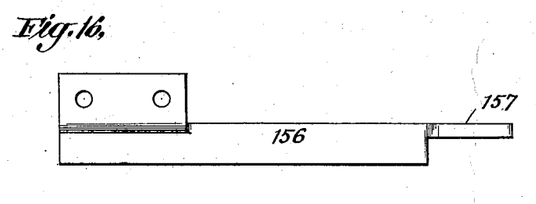
Figure 17:
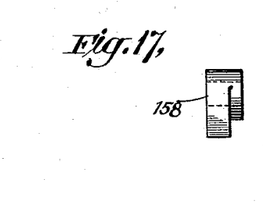

My improved devices for holding the shell while the box is being inserted therein and for aiding in the discharge of the completed box, as shown in Figs. 1, 2, 3, 7, 8, 14, 15, 16, and 17, consists of the following mechanism: To rod 93 is secured piece 156, the forward end of which is adapted as rod 93 is moved forward to strike against the under side of a shoe 158, projecting below and secured to shaft 159. Upon this same shaft are mounted two weighted pieces 160, each provided with a stop-pin 161, projecting downward, as shown in Figs. 3, 14, and 15. The lower surface of pieces 160 form a flat surface adapted to rest upon the top of the shell during the insertion of the box into the shell. The end 157 of piece 156 projects beyond the main part of piece 156 at one side, as shown in Fig. 2 and in Fig. 16. As rod 93 moves forward piece 156 strikes against shoe 158, as shown in Fig. 14, partially rotates shaft 159, raising pieces 160 until the lower surface of these pieces is in line with the upper surface of the flattened shell when opened and squared. The flattened shell passes under these pieces and is opened and squared and the shell inserted in the manner heretofore described. As rod 93 advances piece 156 slips under shoe 158. Shoe 158 and its shaft and pieces 160 are thus held in the position into which they had been forced by piece 156 until the latter piece on its return slips from under shoe 158. Pieces 160 are weighted, so that the weight of the pieces will normally keep shaft 159 and shoe 158 in the position shown in Fig. 3. Pins 161 act as a back-stop to hold the shell from being pushed backward when the box is being inserted. They are provided with springs 165. These springs allow the pins to be pushed in by the shell as it passes under them and is squared and force the pins out behind the shell to act as stops when the latter has passed by. End 157 of piece 156 slips under toe 167 of shoe 158 as piece 156 is pushed forward, and for this purpose piece 156 is fastened only at one end (to rod 93) and can spring downward far enough to permit 157 to pass under toe 167; but on the return stroke of piece 156 the beveled edge 166 of part 157 strikes against toe 167 and rotates shoe 158 and weights 160, causing the shoe and weights to press down upon the completed box and force it positively downward to aid in forcing it down platform 101 and into chute 62 and discharging it from the machine.

If desired, the toothed wheels J may also be used for turning down the rear flap 5 upon the top of the box. These wheels are driven by the following train of gearing—namely, gear-wheel 80, mounted on the shaft of pulley B'; gear-wheel 81, mounted on shaft 82; gear-wheel 83, mounted on the same shaft; pinion 84, and gear-wheel 85 on the shaft of the toothed wheels J.

To insure the steady revolution of belt A and to avoid slipping upon the pulleys, I preferably use pins $b$, projecting from the pulleys and adapted to take into holes $a$ in the belt.

Many modifications and changes may be made in the devices shown in the drawings without departing from my invention.

What I claim as new, and desire to secure by Letters Patent, is—

1. In a machine for making boxes out of blanks having the parts of the blanks which are to constitute the bottom and top of the box provided with side flaps, the combination of means for raising the side flaps of the blanks, means for raising the forward part of the blank out of contact with the means for raising the side flaps and turning it backward and down upon the rear end of the blank to form the top of the box, whereby the side flaps of the top of the box will lie outside of and over the side flaps of the bottom of the box.

2. In a machine for making boxes out of blanks having the parts of the blanks which are to constitute the bottom and top of the box provided with side flaps, the combination of a trough having sides gradually becoming more inclined to raise the side flaps of the blanks as they pass through the trough and provided with a widened portion, folders for raising the forward part of the blank and turning it backward and down upon the rear end of the blank to form the top of the box, upright plates in the said widened part forming a continuation of the walls of the narrow part of the trough to keep the side flaps of the rear part of the blank from spreading in the widened part of the trough, whereby the side flaps of the top of the box will lie outside of and over the side flaps of the bottom of the box.

3. In a machine for making boxes out of blanks having the parts of the blanks which are to constitute the bottom and top of the box provided with side flaps, the combination of means for raising the side flaps of the blanks, means for raising the forward part of the blank out of contact with the means for raising the side flaps and turning it backward and down upon the rear end of the blank to form the top of the box, whereby the side flaps of the top of the box will lie outside of and over the side flaps of the bottom of the box, and means for automatically forcing the blanks through the trough.

4. In a machine for making boxes out of blanks having the parts of the blanks which are to constitute the bottom and top of the box provided with side flaps, the combination of a trough having sides gradually becoming more inclined to raise the side flaps of the blanks as they pass through the trough and provided with a widened portion, folders for raising the forward part of the blank and turning it backward and down upon the rear end of the blank to form the top of the box, upright plates in the said widened part forming a continuation of the walls of the narrow part of the trough to keep the side flaps of the rear part of the blank from spreading in the widened part of the trough, whereby the side flaps of the top of the box will lie outside of and over the side flaps of the bottom of the box, and means for forcing the blank through the trough.

5. In a machine for making boxes out of blanks having the parts of the blanks which are to constitute the bottom and top of the box provided with side flaps, the combination of folders for turning the forward part of the blank up, back and down upon the rear part of the blank to form the top of the box, means for operating the folders, means for turning the rear flap of the bottom of the box up and forward and down upon the box, projections adapted to extend out over the path of the box to prevent the top of the box from rising after the folders have been moved out of contact with it, and a pin connected with each projection also extending into the path of the box and adapted to be struck by the box to move the projections out from over the box to permit the rear flap to pass them.

6. In a machine for making boxes out of blanks having the parts of the blanks which are to constitute the bottom and top of the box provided with side flaps, the combination of folders for turning the forward part of the blank up, back and down upon the rear part of the blank to form the top of the box, means for operating the folders, means for turning the rear flap of the bottom of the box up and forward and down upon the box, projections adapted to extend out over the path of the box to prevent the top of the box from rising after the folders have been moved out of contact with it, and a pin connected with each projection also extending into the path of the box and adapted to be struck by the box to move the projections out from over the box to permit the rear flap to pass them, and means for automatically moving the blank.

7. In a machine for making boxes out of blanks having the parts of the blanks which are to constitute the bottom and top of the box provided with side flaps, the combination of folders for turning the forward part of the blank up, back and down upon the rear part of the blank to form the top of the box, means for operating the folders, means for turning the rear flap of the bottom of the box up and forward and down upon the box, projections adapted to extend out over the path of the box to prevent the top of the box from rising after the folders have been moved out of contact with it, means actuated by the folders when they are moved out of contact with the top of the box to cause the projections to move over the path of the box, a pin connected with each projection also extending into the path of the box and adapted to be struck by the box to move the projections out from over the box to permit the rear flap to pass them, and means actuated by the folders as they return to their normal position to move the projections away from over the path of the box.

8. In a machine for making boxes out of blanks having the parts of the blanks which are to constitute the bottom and top of the box provided with side flaps, the combination of folders for turning the forward part of the blank up, back and down upon the rear part of the blank to form the top of the box, means for operating the folders, means for turning the rear flap of the bottom of the box up and forward and down upon the box, projections adapted to extend out over the path of the box to prevent the top of the box from rising after the folders have been moved out of contact with it, means actuated by the folders when they are moved out of contact with the top of the box, to cause the projections to move over the path of the box, and a pin connected with each projection also extending into the path of the box and adapted to be struck by the box to move the projections out from over the box to permit the rear flap to pass them, means for automatically moving the blank, and means actuated by the folders as they return to their normal positions, to move the projections away from over the path of the box.

9. In a machine for making boxes out of blanks having the parts of the blanks which are to constitute the bottom and top of the box provided with side flaps, the combination of folders for turning the forward part of the blank up, back and down upon the rear part of the blank to form the top of the box, means for turning the rear flap of the bottom of the box up and forward and down upon the box, means automatically actuated for first raising the folders to their full height to raise the forward part of the blank and then partially lowering the folders to bend it back to form the top of the box and then raising them again to clear the rear flap and then lowering them again to their original position.

10. In a machine for making boxes out of blanks having the parts of the blanks which are to constitute the bottom and top of the box provided with side flaps, the combination of folders for turning the forward part of the blank up, back and down upon the rear part of the blank to form the top of the box, means for turning the rear flap of the bottom of the box up and forward and down upon the box, a cam for automatically actuating the folders for first raising the folders to their full height to raise the forward part of the blank and then partially lowering the folders to bend it back to form the top of the box and then raising them again to clear the rear flap and then lowering them again to their original position, and means for operating the cam.

11. In a machine for making boxes out of blanks having the parts of the blanks which are to constitute the bottom and top of the box provided with side flaps, a folder for turning the rear flap up and forward, and a folder for turning it forward and down upon the top of the box adapted to have a horizontal swinging movement and a vertical movement and means for imparting such movements to the folders, whereby the rear flap may be turned up and forward and down upon the top of the box.

12. In a machine for making boxes out of blanks having the parts of the blanks which are to constitute the bottom and top of the box provided with side flaps, a folder for turning the rear flap up and forward, and a folder for turning it forward and down upon the top of the box adapted to have a bodily horizontal swinging movement and a vertical swinging movement upon its support, and means for imparting such movements to the folder, whereby the rear flap may be turned up and forward and down upon the top of the box.

13. In a machine for making boxes out of blanks having the parts of the blanks which are to constitute the bottom and top of the box provided with side flaps, a folder for turning the rear flap up and forward, a swinging arm, a folder pivoted thereto for turning the rear flap forward and down upon the top of the box, means for automatically swinging said arm, whereby a bodily-swinging horizontal motion may be imparted to said folder, and means for swinging the folder on its pivot, whereby a vertical swinging movement upon its support is imparted to the folder and whereby the rear flap may be turned up and forward and down upon the top of the box.

14. In a machine for making boxes out of blanks having the parts of the blanks which are to constitute the bottom and top of the box provided with side flaps, a folder for turning the rear flap up and forward, a swinging arm, a folder pivoted thereto for turning the rear flap forward and down upon the top of the box, means for automatically swinging said arm, whereby a bodily-swinging horizontal motion may be imparted to said folder, pivoted connections with the free end of the folder, and a rigid part of the mechanism adapted to be struck by said connections and to act as a stop therefor as the folder engages with the rear flap whereby the folder will be swung on its pivot as it engages with the rear flap and the latter will be moved forward and down upon the top of the box.

15. In a machine for making boxes out of blanks having the parts of the blanks which are to constitute the bottom and top of the box provided with side flaps, a folder for turning the rear flap up and forward, a swinging arm, a folder pivoted thereto for turning the rear flap forward and down upon the top of the box, a cam, means for moving it backward and forward, connections between the cam and the swinging arm for swinging the latter, the cam being so shaped and moved as to impart the desired reciprocating movement to the swinging arm, and means for swinging the folder on its pivot, whereby a vertical swinging movement upon its support is imparted to the folder and whereby the rear flap may be turned up and forward and down upon the top of the box.

16. In a machine for making boxes out of blanks having the parts of the blanks which are to constitute the bottom and top of the box provided with side flaps, a folder for turning the rear flap up and forward, a swinging arm, a folder pivoted thereto for turning the rear flap forward and down upon the top of the box, a cam, means for moving it backward and forward, connections between the cam and the swinging arm for swinging the latter, the cam being so shaped and moved as to impart the desired reciprocating movement to the swinging arm, pivoted connections with the free end of the folder, a rigid part of the mechanism adapted to be struck by said connections and to act as a stop therefor as the folder engages with the rear flap, whereby the folder will be swung on its pivot as it engages with the rear flap and the latter will be moved forward and down upon the top of the box.

17. In a machine for making boxes out of blanks having the parts of the blanks which are to constitute the bottom and top of the box provided with side flaps, a folder for turning the rear flap up and forward, a swinging-arm, a folder pivoted thereto for turning the rear flap forward and down upon the top of the box, a cam, means for moving it backward and forward, connections between the cam and the swinging arm for swinging the latter, the cam being so shaped and moved as to impart the desired reciprocating movement to the swinging arm, a lever pivoted to the swinging arm and connected with the free end of the folder, and spring-pressed so as to hold the folder normally alongside of the swinging arm, a rigid part of the mechanism adapted to be struck by said lever, and to act as a stop therefor and to move the lever on the swinging arm as the folder engages with the rear flap, whereby the folder will be swung on its pivot as it engages with the rear flap and the latter will be moved forward and down upon the top of the box.

18. In a machine for inserting boxes into shells, a pivoted stop adapted normally to hang out of operative position, means automatically actuated by the machine for forcing the stop into operative position, the stop having a portion adapted to rest upon the shell as the box is being inserted therein, and means automatically actuated by the machine for removing the stop from operative position and means for causing it and its connections in such removal to bear upon the completed box to aid in the discharge of the completed box from the machine.

19. In a machine for making boxes out of blanks having the parts of the blanks which are to constitute the bottom and top of the boxes formed with side flaps, the combination of means for raising the side flaps of the blanks, means for raising the forward part of the blanks above the means for raising the side flaps and turning it backward and down upon the rear end of the blank to form the top of the box, and means for retaining the side flaps of the rear part of the blanks in their raised positions as the forward part or top is turned upward, backward and downward, whereby the side flaps of the top of the box will lie outside and over the side flaps of the bottom of the box.

In testimony whereof I have signed my name to this specification in the presence of two subscribing witnesses.

WM. H. BUTLER.

Witnesses:
　JAMES R. COLLIER,
　EDWIN SEGER.